United States Patent Office 2,827,419
Patented Mar. 18, 1958

2,827,419

ACYLATED GELATINS AND THEIR PREPARATIONS

Dee Tourtellotte, Haddonfield, N. J., and Henry E. Williams, Hollis, N. H., assignors to Charles B. Knox Gelatine Co., Inc., a corporation of New York No Drawing. Application September 24, 1954
Serial No. 458,286

25 Claims. (Cl. 167—78)

The present invention relates to the preparation and purification of derivatives of gelatin having physical and chemical properties that make them useful as blood plasma substitutes for blood plasma volume extenders as well as for many other purposes.

This application is a continuation-in-part of our copending applications, Serial Nos. 268,128 and 280,372, filed January 24, 1952, and April 3, 1952, respectively. Both of said applications are now abandoned.

It has been well established that properly prepared gelatin solutions made sterile, pyrogen and antigen free, and with certain considerations for maintaining a relatively high average molecular size with controlled colloid osmotic pressure, have been useful for parenteral use in controlling circulating blood volume in the experimental and clinical management of shock either from hemorrhages and burns or traumatic and psychogenic causes. Due to certain properties inherent in gelatin as prepared for intravenous use in the management of shock, interest has continued in the improvement or modification of the properties and function of gelatin for such use by appropriate physical and chemical modification.

The efforts to improve the properties of gelatin for use as blood plasma substitutes or extenders have in general taken either of the following lines:

(1) Degradation of the gelatin molecule by either controlled heating in solution or chemical or enzymic hydrolysis to some predetermined stage such that a 3 to 6% solution will no longer form a gel at average room temperature (70° F). The reduction of average molecular size of the gelatin that is brought about in such a process is generally accompanied by a very significant reduction in the retention period of such materials when they are injected into the intact blood vascular system.

(2) The coupling of gelatin molecules into larger complexes by means of chemical treatment with the dialdehyde, glyoxal, followed by oxidation with $H_2O_2$ for increasing the number of ionizable groups at pH 7.3 has been attempted with some success. The reaction has been difficult to control and results in a finished preparation probably having greater moleculer heterogenicity than that of the untreated gelatin.

Gelatin is a derived protein composed of various amino acids linked between adjacent imino and carbonyl groups to provide the classical peptide bond. The molecular weight of gelatin is characteristically large (values of the average molecular weight vary from approximately 10,000 to 100,000) and is significantly heterogeneous within any particular type and grade. Gelatin is composed of asymmetric or rod like types of molecules, resulting from the hydrolysis of long chains of polypeptide residues in white connective tissue. Evidence has indicated that the primary hydrolysis of collagen takes place at reactive intervals along these chains to produce an ideal parent undegraded gelatin molecule. This is followed in varying degree by a secondary hydrolysis at random intervals at the less reactive bonds of the ideal parent gelatin molecule. This explains how the degradation reaction is responsible for the random heterogeneous molecular pattern of any particular sample of gelatin.

Thus the asymmetry of the gelatin molecule, together with the heterogeneous molecular pattern, imparts the inherent properties of gel formation and viscosity to solutions of gelatin prepared for intravenous administration. It has been shown that the various molecular sizes do not function uniformly in the circulation, neither are they retained with an equal degree of effectiveness.

It is generally accepted that gelatin proteins are true amphoteric electrolytes with ionization and physicochemical properties depending upon the pH value of their solutions. It is also a fact that every protein including gelatin has a definite isoelectric point at which ionization and therefore physical and chemical reactivity are minimal. Some of these properties which show a minimum influence at the isoelectric point include solubility, viscosity, colloid osmotic pressure and chemical activity. Thus, the colloid osmotic pressure of a gelatin solution will be at a minimum at the isoelectric point. Since the isoelectric point of gelatin is influenced by the relative proportions of the free amino and free carboxyl groupings which provide the reactive ionic groupings of the proteins, any alterations in this proportion will change the physicochemical properties materially.

It is an object of our invention to provide stable chemical addition products, or adducts, with gelatin that are characterized by improved properties for various purposes including use as blood plasma substitutes or blood extenders.

It is a further object of our invention to provide a process of preparing adducts with gelatin involving alteration of the ratio of free amino to free carboxylic groups so as to decrease the isoelectric points of the resulting adducts as compared to gelatin and thereby improve the colloid osmotic function of such gelatin materials for use as blood plasma substitutes or blood extenders.

It is a still further object of our invention to provide a process of fractionating and recovering in a relatively pure state selected fractions of the chemical addition products or adducts, resulting from the reaction of gelatin with certain chemical compounds as more particularly hereinafter described.

We have found that anhydrides of certain polycarboxylic acids, especially the following: succinic anhydride, citraconic anhydride, itaconic anhydride, aconitic anhydride, and maleic anhydride, and also the chlorides of certain dicarboxylic acids, especially the following: succinyl chloride (butanedioyl chloride) and fumaryl chloride react to form stable addition products or derivatives of gelatin which can be separated and purified from undesirable products of the reaction by making appropriate use of their distinct isoelectric properties as hereinafter described.

We have further found that it is possible by appropriate selection of the gelatin starting material so as to insure that it will be composed of gelatin molecules falling within a predetermined relatively narrow and appropriately selected average molecular size range, to produce gelatin addition products by reaction with polycarboxylic acid anhydrides and dicarboxylic acid chlorides that may be used to provide in effective oncotic concentration any predetermined degree of fluidity in the finished addition product.

Mor particularly, we have found that if a gelatin starting material consisting largely, or preferably substantially completely, of gelatin molecules of a number average molecular size range of about 15,000 to 36,000 is reacted with one of the aliphatic polycarboxylic acid anhydrides or dicarboxylic acid chlorides above mentioned, a gelatin addition product is produced which may be separated by appropriate fractionating and purifying procedure from other products of the reaction and recovered in the form of a pyrogen- and antigen-free non-toxic material suitable for use as a blood plasma extender.

We have also found that the elsewhere described derivatives of gelatin resulting from reactions with dicarboxylic acid anhydrides such as succinic anhydride are variable in composition and toxic within any single preparation as based upon chemical analysis, physical chemical behavior and physiological reactions. They contain physiologically toxic materials which cannot be removed without the isoelectric precipitation and fractionation procedure disclosed herein.

The gelatin derivatives of our invention may be prepared by reacting the various carboxylic acid compounds described hereinbefore with gelatin of a predetermined molecular size range. The reaction proceeds satisfactorily at a pH of 6–10 and over a temperature range of 20° C. to 40° C. If higher temperatures are used the reaction will proceed more rapidly, but care should be taken to see that heating is discontinued as soon as the reaction is complete so as to avoid or minimize degradation of the gelatin which would lead to further reduction in the number average molecular weight of the gelatin component of the reaction mixture. Appropriate additions of sodium hydroxide solution or its equivalent are added initially and during the course of the reaction to maintain the desired pH conditions.

When the reaction has gone to completion, the reaction products may be separated by acidifying the mixture to the point of maximum insolubility which is generally about 1.0 to 1.5 pH units below the true isoelectric point of the desired gelatin derivative. The material which separates from the reaction mixture at the point of maximum insolubility, which generally is within a pH range of 2.0 to 3.5, varying with the particular polycarboxylic acid compound used to react with the gelatin, is an immiscible, high density syrup which separates as a sharply defined oil like layer in the bottom of the reaction vessel. This material which represents the more fully reacted substitution product as shown by its precise isoelectric properties is carefully separated from the mother liquors which contain the lower molecular weight and incompletely reacted fractions of gelatin, also the acid by-products of the reaction, by decantation, centrifugation or other separatory methods. The immiscible syrup or heavy oil fraction is further refined and freed from lower molecular weight substitution products by redissolving in distilled water with adjustment to a pH of 4 to 6, followed by precipitation brought about by acidifying to attain the range of 2.0 to 3.5 with HCl and additions of NaCl. This precipitation step may be repeated if necessary. This purification procedure is important for the elimination of lower molecular weight substitution products, incompletely reacted products and acid by-products which produce abnormal pharmacological and/or toxic effects on intravenous administration. Alternative methods of purifying the heavy addition product include reprecipitation at approximately pH 2–3.5 from methyl alcohol, ethyl alcohol, n-propyl alcohol, isopropyl alcohol or acetone. The sodium chloride precipitated material occludes a certain amount of concentrated NaCl solution which will provide a source of the sodium chloride required for making up a finished saline solution (0.9% sodium chloride) of the gelatin addition product when it is destined to be used as a blood plasma substitute or extender. Any excess of occluded NaCl may be removed by dialysis or other appropriate procedure.

The by-products remaining after the primary precipitation and fractionation steps of our process may be subjected to additional fractionating treatments. They have been further separated into further fractions as follows: When the mother liquors from the isoelectric separation are chilled to approximately 5° C. a flocculent precipitate is formed which is best isolated by centrifugation although it may also be separated by filtration at the low temperature at which it is deposited. This precipitated material may be further refined by redissolving in water heated to room temperature, then adjusting to a pH of about 3 and thereafter reprecipitating by the addition of suitable amounts of sodium chloride.

The filtrate from this fraction contains still smaller molecular weight material which may be recovered by the addition of suitable amounts of sodium chloride. The resulting precipitated material representing a third fraction may be refined by redissolving in water, adjusting the pH to bring it within the range 1.8–2.8 and then adding a suitable amount of sodium chloride. The mother liquors after separation of this third fraction contain recoverable products which have been precipitated as iron compounds reactive with ammonium sulphide as well as with disodium phosphate.

The primary addition products obtained by reacting a specific molecular weight fraction of gelatin with a polycarboxylic acid anhydride or a dicarboxylic acid chloride such as succinic anhydride or succinyl chloride are compounds having higher molecular weights than the gelatin used. The molecules are also more symmetrical and have an increased number of ionizable carboxyl groups which significantly lowers the isoelectric point of the gelatin derivative or addition product below that of the gelatin itself. From the standpoint of their use as blood volume extenders the more symmetrical type of molecule represented by the gelatin derivatives above mentioned has been shown to be much better retained in the intact blood vascular system of either the normal or experimental shock animal than is an unmodified gelatin. Also, the number of ionizable groups in the addition product have been so increased that at pH 7.3 the effective colloid osmotic pressure is significantly increased.

The principal features of these gelatin derivatives which make them valuable as blood plasma extenders are as follows:

(1) The highly asymmetric gelatin molecule has been made more symmetrical thus improving its capillary retention.

(2) The products of a higher number average molecular range prepared by reacting gelatin of an appropriately selected molecular size range with an aliphatic polycarboxylic acid anhydride or an aliphatic dicarboxylic acid chloride followed by appropriate fractionation and purification as herein described, are non-toxic and function as effective colloid osmotic agents.

(3) The increased molecular symmetry of the heavy isoelectric fraction made from predetermined molecular size ranges of gelatin greatly decreases the tendency to form gels at refrigerated temperatures and at a pH value approximating 7.3, thus bringing about a desirable degree of fluidity and overcoming one of the objections to unmodified gelatin as a plasma substitute particularly for mass casualties where treatment for shock must frequently be undertaken in the field.

(4) The fractionated reaction products of gelatin and the compounds described herein are characterized by the increase in number of ionizable carboxyl groups. This results in a significant lowering of the isoelectric point which markedly increases the effective colloid osmotic pressure of the gelatin addition product at the pH value of 7.3. The extent to which the isoelectric point is lowered varies somewhat with the particular polycarboxylic acid anhydride or chloride reaction product. In the case of the fumaryl chloride reaction product the isoelectric point corresponds approximately to pH 3.8

The purification procedure that we have found to be useful for obtaining new and effective plasma volume extenders or plasma substitutes from the products of the reaction of gelatin with the aliphatic polycarboxylic acid compounds disclosed herein involves in general the precipitation from the reaction mixture of that material which appears as an insoluble and immiscible syrup or oil at a particular pH within the range 2.0 to 3.5, depending on the starting material, redissolving the material in distilled water by adjusting to a pH of 5 to 7 with the use of NaOH and reprecipitation at about pH 3 by the use of HCl and addition of appropriate amounts of NaCl. The product is dissolved and reprecipitated again if necessary to remove last traces of reaction products and/or smaller molecular weight derivatives which have markedly different solubility properties. Following reprecipitation near the isoelectric point with addition of NaCl further purification may be effected by dialysis against water through semi-permeable membranes, for example, cellulose acetate films. Another method of purification that may be employed consists in precipitation of the isoelectric gelatin addition product or derivative from its water solutions by use of methyl alcohol, ethyl alcohol, isopropyl alcohol or acetone.

The gelatin derivatives prepared, fractionated, and refined as above described to render them free from any untoward reactions including pyrogenicity, antigenicity, or toxicity when put to parenteral use, are finally made into a solution of proper concentration, adjusted to the approximate pH of the blood and containing an isotonic concentration of sodium chloride or other such solution of balanced physiological electrolytes. Further, the purified gelatin derivatives properly adjusted, may be suitably dried for reconstitution at a later time and in such manner as is physiologically indicated.

Although it is preferred to start with gelatin that has been partially degraded or otherwise brought to a number average molecular size within the range of about 15,000 to 36,000, it is to be understood that the fractionation and purification procedures described herein may be applied to reaction mixtures resulting from the reaction of a polycarboxylic acid compound of one of the kinds previously mentioned with undegraded gelatin or gelatins having a wider molecular size range or which are constituted of gelatin molecules falling within a different range than that above specified. When undegraded gelatin or a gelatin having a wider molecular size range is used a more heterogenous mixture of reaction products will result, and it usually will be necessary to resort to a greater number of purification steps to obtain a satisfactory product. If a gelatin starting material composed of gelatin molecules falling within a substantially different range is used, appropriate adjustments of the degree of acidification may be required to bring the acidity of the reaction mixture to the isoelectric point of the particular gelatin derivative sought to be recovered.

The lowering of the isoelectric point and reduction of the gelation temperature of gelatin has been emphasized herein relative to use of the addition products as a blood plasma extender. No distinction has been made between man and other mammals since the extenders are intended for either. The addition product of gelatin with succinic anhydride has been extensively used and tested with human patients with excellent results in raising and maintaining blood pressure levels under shock conditions caused by surgery, accident, hemorrhage, and other causes.

The addition products of gelatin with succinic anhydride, itaconic anhydride, maleic anhydride and succinyl chloride have been tested and shown effective to raise the blood pressure of dogs after extensive induced bleeding and also effective to cause the dogs to be able to withstand a second bleeding shortly after the first if the first lost blood volume was replaced by an isotonic solution of one of the addition products. Since dogs are quite commonly bled in various laboratory experiments, and represent an expensive item in many research projects, a product that will quickly compensate for the lost blood is very useful for this purpose alone.

Moreover, there are many other uses that may be made of the novel products of this invention that capitalize on their lower isoelectric points and decreased gelation properties.

Animal glue is a degraded collagen, i. e., gelatin, although generally not as highly refined as edible or medicinal gelatins. Generally urea or thiourea is added to the glue to restrain gelation before its ultimate use. It is thus possible to eliminate or decrease the amount of urea in the glue by using the products of this invention.

Gelatin is also used for sizing rayon but the gelatin solutions are of necessity very dilute to avoid gelation although it is otherwise desirable to use more concentrated solutions. More concentrated solutions are of course possible without gelation if the present products are used.

It has been found that formaldehyde does not affect the products of this invention, probably because the free amino groups are combined with carboxylic groups of the anhydrides or chlorides. Therefore these new products can be used in film coatings to get differential gelatins required for color films.

It has further been found that the products of the present invention are considerably more plastic than previously known gelatin. Therefore, these new products may be incorporated into various chewing gum bases such as polyvinyl acetate or chicle whereas regular gelatin has been considered too brittle for such use.

Along these same lines, these new products may be used as plasticizing agents in admixture with regular gelatin for the manufacture of soft gelatin capsules, thus eliminating the use of completely foreign substances such as glycerol.

The following examples illustrate how the new class of refined gelatin derivatives having improved colloid osmotic function for use as plasma substitutes are made:

*Example 1*

3000 cc. of a 6% solution of gelatin (180 grams) having a number average molecular weight of approximately 36,000 ($H_0=.36$ at 55° C.) was held at a temperature of 36° C. and adjusted to pH 9 with a concentrated NaOH solution. 60 grams of powdered succinic acid anhydride was gradually added while stirring the gelatin solution. As the reaction proceeded the pH was maintained in the range of 8.5–10 by the regular addition of NaOH in a concentrated aqueous solution. After the addition of the succinic acid anhydride was completed and no further change in pH was evident, the reaction was regarded finished. The mixture was then acidified with 132 cc. concentrated HCl to pH 2.7. After a short time of settling an immiscible high density syrup like fraction separated as a clear layer in the bottom of the vessel. The supernatant liquid containing low molecular weight materials and reaction by-products was grossly separated by syphoning and the heavy layer was more completely separated in a separatory funnel. The heavy oily fraction representing the desired adduct product was then dissolved in 2 liters of distilled water at pH 4.5–5 and then adjusted to pH 2.5–3.0 and precipitated by the gradual addition of 584 grams of solid sodium chloride to give an approximately 30% concentration of NaCl. The precipitate first disperses throughout the solution, then as the concentration of NaCl increases in the solution, the adduct forms a coagulum which floats. Care must be taken during final addition of salt to avoid enmeshing it in the coagulum. The solution containing sodium chloride and reaction products of smaller molecular weight was separated from the coagulum which was worked to allow encapsulated brine droplets to run off as completely as possible. Substantially complete removal of the brine is necessary in order to reach a NaCl content at/or below the ratio of 1 part NaCl to 3.33 parts of purified addition product for allowing isotonic NaCl concentration of 0.9% in the final intravenous preparation based on a 3% gelatin succinate addition product. The purified product was then dissolved in sterile, pyrogen free distilled water aided by use of concentrated NaOH to yield a solution at pH 7.0. This solution of the adduct was further adjusted after analysis to a final 3% concentration in isotonic NaCl at pH 7.3. The yield of purified gelatin-succinate addition product was 105 grams or a 58.3% yield based on the starting quantity of gelatin used. The solution was filtered, bottled in 500 cc. bottles and sterilized at 15 lbs. steam pressure for 20 minutes when it was ready for intravenous administration. The product in 3% concentration in an isotonic NaCl solution gelled at approximately 10° C.

Where it is desirable in these examples to make a solution of the purified addition product of a concentration higher than 3%, it is necessary to dialyze the NaCl precipitated and washed material in solution against water to remove further quantities of NaCl so that the final solution will not contain more than the required 0.9% NaCl content. As an alternate to salting out and dialysis for removal of the reaction by-products from the heavy fraction of the anhydride addition product precipitation by methyl alcohol, ethyl alcohol, isopropyl alcohol or acetone may be used.

Example 2

The above procedure was repeated except that the reaction between the gelatin and succinic anhydride was carried out in the range of pH 5.5–6.5. The reaction mixture was then subjected to fractionation to obtain the desired addition product and this was subjected to repeated purifying treatments in a similar manner as described in Example 1. The yield of the desired gelatin succinate was considerably less than that obtained in carrying on the reaction as described in Example 1.

Example 3

The procedure in Example 1 above was repeated except that gelatin starting material having a number average molecular weight of approximately 20,000 ($H_0=.18$ at 55° C.) was used. The heavy fraction of addition product gave a yield of 49.5% based on the quantity of gelatin starting material used. The purified addition product gave a 3% solution in isotonic NaCl at pH 7.3 which was fluid at temperatures below 5° C.

Example 4

1500 cc. of a 6% solution of gelatin (90 grams) having a number average molecular weight of approximately 20,000 to 25,000 was adjusted to a temperature of 13° C. and to pH 9 with NaOH. 30 grams of itaconic anhydride was added slowly with stirring while maintaining the pH in the range of 9 to 10 by addition of NaOH. After the addition of the itaconic anhydride was completed and no further change in the pH was evident, the reaction was regarded finished. Concentrated HCl was added to the mixture to pH 3.5 where the separation of a heavy fraction was sharp and distinct. The heavy fraction separated by use of a separatory funnel was dissolved with the aid of NaOH in one liter of distilled water at pH 3.95, and then reprecipitated at pH 3.5 by adjustment of the pH with HCl. This reprecipitated gelatin-itaconic addition product gave a yield of 102% based on the starting gelatin weight. It was then brought to a 6% concentration in isotonic NaCl at pH 7.3 and autoclaved at 15 lbs. steam pressure for 20 minutes. It was then ready for intravenous administration. The 6% solution did not form a gel at 5° C. during 18 hours' observation. The condensation reaction gave a type of heavy fraction which could be precipitated at its isoelectric point from water solutions without NaCl addition.

Example 5

1500 cc. of a 6% solution of gelatin (90 grams) having a number average molecular weight of approximately 15,000–20,000 ($H_0=.14-.18$ at 55° C.) was held at room temperature and adjusted to pH 9 with NaOH. 30 grams of citraconic anhydride was added slowly with stirring while maintaining the pH in the range of 9–10. The reaction mixture was acidified to pH 2.78 at which point the heavy fraction separated sharply. It was transferred to one liter of distilled water and dissolved therein by suitable adjustment of the pH value with the use of concentrated NaOH. After again acidifying to a pH of 2.78, this addition product was precipitated by addition of 150 grams of NaCl. This gelatin citraconic anhydride addition product in 6% concentration in isotonic saline at pH 7.3 gave a gel at 5° C. after 18 hours. After a second purification involving re-solution, readjustment of the pH to 2.78 and precipitation by addition of salt, the product in concentrated aqueous solution at pH 7 was dialyzed in Visking tubing against running water for two hours to reduce the salt content below 0.9 gram per 6 grams of gelatin addition product.

Example 6

3000 cc. of 6% solution of gelatin (180 grams) having a number average molecular weight of approximately 20,000 ($H_0=0.18$) were held at a temperature of 28°–37° C. and adjusted to pH 9 with concentrated NaOH solution. 60 grams of succinyl chloride were gradually added while stirring the gelatin solution. As the reaction proceeded the pH was maintained in the range of 8.5–10 by the regular addition of concentrated NaOH solution until 128 cc. had been added. After the addition of the succinyl chloride was completed and no further change in pH was evident, the reaction was regarded finished. The mixture was then acidified with 89 cc. concentrated HCl to pH 2.3. After a short time of settling, an immiscible, high density, syrup like fraction separated as a clear layer in the bottom of the vessel. The supernatant liquid containing low molecular weight materials and reaction by-products was grossly separated by syphoning and the heavy layer further or more completely separated in a separatory funnel. The heavy oily fraction representing the desired primary gelatin derivative was dissolved in 1.5 liters of distilled water and separated as a coagulum by the gradual addition of 607 grams of solid sodium chloride at pH 3.0. The precipitate first disperses throughout the solution, then as the concentration of NaCl increases in the solution, the gelatin derivative forms a coaglum. Care must be taken during final addition of salt to avoid enmeshing it in the cagulum. The solution of sodium chloride-containing reaction products of smaller molecular weight was decanted leaving the coaglum which was worked to allow encapsulated brine droplets to run off as completely as possible. Rather complete removal of the brine was necessary in order to reach a salt content at/or below the ratio of 1 part NaCl to 3.33 parts of purified product for allowing isotonic NaCl concentration of 0.9% in the final intravenous preparation based on a 3% gelatin succinyl chloride substitution product. The purified product was then dissolved in sterile, pyrogen free distilled water aided by use of concentrated NaOH solution to yield a solution at pH 7.0. This solution was further adjusted after analysis to a final 3% gelatin derivative solution in 0.9% NaCl at pH 7.3. The yield of purified gelatin succinyl chloride product was 94 grams or a 52.2% yield based on the starting quantity of gelatin used. The solution was filtered, bottled in 500 cc. bottles and sterilized at 15 lbs. steam pressure for 20 minutes when it was ready for intravenous administration. The product in 3% concentration in a 0.9% NaCl solution remained fluid at temperatures below 5° C.

Example 7

3000 cc. of a 6% solution of gelatin (180 grams) having a number average molecular weight of approximately 20,000 ($H_0=0.18$) were held at a temperature of 22°–30° C. and adjusted to pH 9 with NaOH solution.

60 grams of fumaryl chloride were gradually added while stirring the gelatin solution. As the reaction proceeded the pH was maintained in the range of 8.5-10 by the regular addition of concentrated NaOH solution until 133 cc. had been added. After the addition of the fumaryl chloride was completed and no further change in pH was evident, the reaction was regarded finished. The mixture was then acidified with 80 cc. concentrated HCl to pH 2.5. After a short time of settling, an immiscible, high density, syrup like fraction separated as a clear layer in the bottom of the vessel. The supernatant liquid containing low molecular weight materials and reaction by-products was grossly separated by syphoning and the heavy layer further or more completely separated in a separatory funnel. The heavy oily fraction representing the desired primary gelatin derivative was dissolved in 2.0 liters of distilled water and adjusted to pH 7.0 with NaOH. It was necessary to filter a small amount of insoluble floc before proceeding with the precipitation and separation of the heavy fraction as a coagulum by the gradual addition of 600 grams of solid sodium chloride at pH 3.0. The precipitate first disperses throughout the solution, then as the concentration of NaCl increases in the solution the gelatin derivative forms a coagulum which floats. Care must be taken during final addition of salt to avoid enmeshing it in the coagulum. The concentrated solution of sodium chloride-containing reaction products of smaller molecular weight was decanted leaving the coagulum which was worked to allow encapsulated brine droplets to run off as completely as possible. Rather complete removal of the brine was necessary in order to reach a salt content at/or below the ratio of 1 part NaCl to 3.33 parts of purified product for allowing isotonic NaCl concentration of 0.9% in the final intravenous preparation based on a 3% gelatin furmaryl chloride substitution product. The purified product was then dissolved in sterile, pyrogen free distilled water aided by use of concentrated NaOH solution to yield a solution at pH 7.0. This solution was further adjusted after analysis to a final 3% gelatin derivative solution in 0.9% NaCl at pH 7.3. The yield of purified gelatin furmaryl chloride product was 80 grams or a 44.4% yield based on the starting quantity of gelatin used. The solution was filtered, bottled in 500 cc. bottles and sterilized at 15 lbs. steam pressure for 20 minutes when it was ready for intravenous administration. The product in 3% concentration in a 0.9% NaCl solution remained fluid at temperatures below 5° C.

It will be understood that other halides of the aliphatic dicarboxylic acids may be used instead of the chlorides of Examples 6 and 7 in producing useful gelatin derivatives by the procedures above described and that such derivatives may be purified by following similar procedures as we set forth herein in describing the chloride derivatives.

It will be appreciated that the isoelectric point of an adduct described herein or any other protein products is determined exactly only by careful laboratory tests and the use of a highly purified starting material. Therefore, in the fractionation procedures described herein the pH of the solution is lowered to a point at which it appears that the highest yield will be obtained. It has been determined by subsequent and careful tests for the isoelectric point of the adducts that the points of heaviest yield are near but generally from 1.0 to 1.5 pH units below the true isoelectric point. Actually precipitation will occur over a range from about the true isoelectric point to about 2 pH units therebelow. The difference between the true isoelectric point and the point of heaviest yield is evidently due to the products other than the adduct present during the precipitation which tend to act as buffers. Thus the point of heaviest precipitation is indicative of the isoelectric point but cannot be used as an accurate determination thereof, especially where other products are present such as at the fractionation steps described herein.

We claim:
1. The process of preparing gelatin derivatives which comprises reacting gelatin previously degraded to a number average molecular weight within the range 15,000 to 36,000 with a polycarboxylic acid compound selected from the group consisting of succinic, citraconic, itaconic, aconitic and maleic anhydride and succinyl and fumaryl chloride in an aqueous medium in which the pH is maintained between 6 and 10, thereafter adjusting the acidity of the reaction mixture to a pH range from about the isoelectric point of the resulting gelatin derivative to 2 pH units therebelow and precipitating said gelatin derivative as a coagulum, separating said coagulum from the reaction mixture and further working said coagulum to remove therefrom any remaining incompletely reacted gelatin and any non-coagulum reaction products.

2. The process of preparing gelatin derivatives as claimed in claim 1 wherein said compound is succinic anhydride and the acidity of said reaction mixture is adjusted to approximately pH 2.7 to bring about precipitation of said gelatin derivative as a coagulum.

3. The process of preparing gelatin derivatives as claimed in claim 1 wherein said compound is itaconic anhydride and the acidity of said reaction mixture is adjusted to approximately pH 3.5 to bring about precipitation of said gelatin derivative as a coagulum.

4. The process of preparing gelatin derivatives as claimed in claim 1 wherein said compound is maleic anhydride and the acidity of said reaction mixture is adjusted to approximately pH 3 to bring about precipitation of said gelatin derivative as a coagulum.

5. The process of preparing gelatin derivatives as claimed in claim 1 wherein said compound is succinyl chloride and the acidity of said reaction mixture is adjusted to approximately pH 2.3 to bring about precipitation of said gelatin derivative as a coagulum.

6. The process of preparing gelatin derivatives as claimed in claim 1 wherein said compound is citraconic anhydride and the acidity of said reaction mixture is adjusted to approximately pH 2.8 to bring about precipitation of said gelatin derivative as a coagulum.

7. The process of recovering gelatin derivatives from reaction mixtures resulting from the reaction in an aqueous medium and at a pH of 6 to 10 of gelatin with a polycarboxylic acid compound selected from the group consisting of succinic, citraconic, itaconic, aconitic and maleic anhydride and succinyl and fumaryl chloride, which comprises acidifying the mixture to a pH range from about the isoelectric point of the gelatin derivative sought to be recovered to 2 pH units therebelow and precipitating said derivative as a coagulum, separating said coagulum and further working the same to recover the said derivative substantially free from any remaining incompletely reacted gelatin and any non-coagulated reaction products.

8. The process of recovering gelatin derivatives as claimed in claim 7 wherein said compound is succinic anhydride and said mixture is acidified to a pH of approximately 2.7.

9. The process of recovering gelatin derivatives as claimed in claim 7 wherein said compound is itaconic anhydride and said mixture is acidified to a pH of approximately 3.5.

10. The process of recovering gelatin derivatives as claimed in claim 7 wherein said compound is maleic anhydride and said mixture is acidified to a pH of approximately 3.

11. The process of recovering gelatin derivatives as claimed in claim 7 wherein said compound is succinyl chloride and said mixture is acidified to a pH of approximately 2.3.

12. The process of recovering gelatin derivatives as claimed in claim 7 wherein said compound is citraconic anhydride and said mixture is acidified to a pH of approximately 2.8.

13. A gelatin derivative consisting of that fraction of the products resulting from reacting gelatin having a number average molecular weight within the range 15,000 to 36,000 with a polycarboxylic acid compound selected from the group consisting of succinic, citraconic, itaconic, aconitic and maleic anhydride and succinyl and fumaryl chloride in an aqueous medium adjusted to a pH of 6 to 10 and precipitating as the coagulum from the reaction mixture upon acidifying said mixture to a pH range from about the isoelectric point of said fraction to 2 pH units therebelow.

14. A gelatin derivative as claimed in claim 13 wherein said compound is succinic anhydride and said mixture is acidified to a pH of approximately 2.7.

15. A gelatin derivative as claimed in claim 13 wherein said compound is itaconic anhydride and said mixture is acidified to a pH of approximately 3.5.

16. A gelatin derivative as claimed in claim 13 wherein said compound is maleic anhydride and said mixture is acidified to a pH of approximately 3.

17. A gelatin derivative as claimed in claim 13 wherein said compound is succinyl chloride and said mixture is acidified to a pH of approximately 2.3.

18. A gelatin derivative as claimed in claim 13 wherein said compound is citraconic anhydride and said mixture is acidified to a pH of approximately 2.8.

19. A gelatin derivative consisting of that fraction of the products resulting from reacting gelatin with a polycarboxylic acid compound selected from the group consisting of succinic, citraconic, itaconic, aconitic and maleic anhydride and succinyl and fumaryl chloride in an aqueous medium adjusted to a pH of 6 to 10, and precipitating as a coagulum from the reaction mixture upon acidifying said mixture to a pH range from about the isoelectric point of said fraction to 2 pH units therebelow.

20. A composition of matter suitable for use as blood plasma extender consisting of a dispersion in physiological saline of a gelatin derivative resulting from the reaction of gelatin having a number average molecular range within the range 15,000 to 36,000 with a polycarboxylic acid compound selected from the group consisting of succinic, citraconic, itaconic, aconitic and maleic anhydride and succinyl and fumaryl chloride in an aqueous medium adjusted to a pH of 6 to 10 and which is precipitated as the coaglum from the reaction mixture upon acidifying said mixture to a pH range from about the isoelectric point of said derivative to 2 pH units therebelow, said gelatin derivative before it is incorporated with the physiological saline having been purified by suitable working, washing and reprecipitation of said coaglum to remove therefrom any incompletely reacted gelatin and any uncoagulated reaction products, said composition being free from physiologically toxic materials and remaining fluid at temperatures below 5° C. when existing as 3–6% concentrations of said gelatin derivative in isotonic NaCl at pH 7.3.

21. A composition as claimed in claim 20 wherein said compound is succinic anhydride and the acidity of said mixture is adjusted to approximately pH 2.7.

22. A composition as claimed in claim 20 wherein said compound is itaconic anhydride and the acidity of said mixture is adjusted to approximately pH 3.5.

23. A composition as claimed in claim 20 wherein said compound is maleic anhydride and the acidity of said mixture is adjusted to approximately pH 3.

24. A composition as claimed in claim 20 wherein said compound is succinyl chloride and the acidity of said mixture is adjusted to approximately pH 2.3.

25. A composition as claimed in claim 20 wherein said compound is citraconic anhydride and the acidity of said mixture is adjusted to approximately pH 2.8.

References Cited in the file of this patent

UNITED STATES PATENTS

| | | |
|---|---|---|
| 2,178,569 | Ferguson | Nov. 7, 1939 |
| 2,518,666 | Damschroeder et al. | Aug. 15, 1950 |
| 2,525,753 | Yutzy et al. | Oct. 10, 1950 |

FOREIGN PATENTS

| | | |
|---|---|---|
| 831,630 | France | Sept. 9, 1938 |

OTHER REFERENCES

Loewe et al.: Am. J. Med. Sci., pp. 54–63, p. 55 pert., July 1944.

Amberson: Biol. Reviews, pp. 48, 79, pp. 76 and 77 pert., January 1937.